United States Patent [19]

Fujisawa et al.

[11] Patent Number: 4,662,470

[45] Date of Patent: May 5, 1987

[54] OIL COOLER APPARATUS IN MOTORIZED TWO-WHEELED VEHICLE

[75] Inventors: Yoichi Fujisawa; Hiroaki Hasumi, both of Asaka, Japan

[73] Assignee: Honda Giken Kogyo Kabushiki Kaisha, Tokyo, Japan

[21] Appl. No.: 744,600

[22] Filed: Jun. 14, 1985

[30] Foreign Application Priority Data

Jun. 14, 1984 [JP] Japan .................. 59-120740

[51] Int. Cl.⁴ .............................. B60K 11/04
[52] U.S. Cl. ........................ 180/219; 165/44; 180/68.4; 180/229
[58] Field of Search .......... 180/219, 229, 68.4, 180/68.6; 165/41, 42, 44

[56] References Cited

U.S. PATENT DOCUMENTS

| 2,781,859 | 2/1957 | Warren | 180/229 |
| 4,016,945 | 4/1977 | Shibata | 180/229 |
| 4,171,729 | 10/1979 | Shibata | 180/229 |
| 4,182,404 | 1/1980 | Beveridge | 165/41 |
| 4,396,086 | 8/1983 | Hattori | 180/229 |
| 4,478,306 | 10/1984 | Tagami | 165/41 |
| 4,516,630 | 5/1985 | Yamaguchi | 180/229 |
| 4,557,345 | 12/1985 | Hamane | 180/229 |

FOREIGN PATENT DOCUMENTS

| 51-64245 | 6/1976 | Japan . |  |
| 57-39997 | 8/1982 | Japan . |  |
| 0128924 | 8/1983 | Japan | 180/229 |

Primary Examiner—John A. Pekar
Attorney, Agent, or Firm—Armstrong, Nikaido, Marmelstein & Kubovcik

[57] ABSTRACT

An oiler cooler surrounding the head pipe of a motorcycle on three side and is fixed thereto. It is positioned vertically between the top bridge and the bottom bridge and laterally between the pair of left and right front fork pipes which are inserted through the top and bottom bridges. Upon turning, the cooler remains stationary relative to the motorcycle main frame.

7 Claims, 11 Drawing Figures

FIG_1

OIL COOLER APPARATUS IN MOTORIZED TWO-WHEELED VEHICLE

BACKGROUND OF THE INVENTION

This invention relates to an oil cooler apparatus for use in a motorized two-wheeled vehicle, such as a motorcycle or the like.

A known apparatus of this kind has been provided on an upper front side of a vehicle body frame having a front wheel, a rear wheel and an internal combustion engine in the middle thereof for air-cooling oil introduced thereinto from the engine. It has been usual with this type of apparatus that the oil cooler is fixed to a front fork comprising a pair of right and left fork pipes disposed in front of a head pipe constituting a front portion of the vehicle body frame.

This arrangement, however, is inconvenient in that, at the time of turning of the front fork on steering, the oil cooler is required to be moved therewith. As a result, the steering is liable to be burdened with a load thereof. In addition, an oil hose extending between the oil cooler and the engine is caused to bend at times to result in lowering in its durability.

OBJECT AND SUMMARY OF THE INVENTION

This invention has for its object to provide an apparatus free from those inconveniences.

This invention is useful in an apparatus of the type that a vehicle body frame having a front wheel, a rear wheel and an internal combustion engine in the middle thereof is provided on an upper part of a front side therewith with an oil cooler for air-cooling oil introduced thereinto from the engine. The invention is characterized in that the oil cooler is a shaped one that surrounds a circumference of a head pipe constituting a front portion of the vehicle body frame, so as to extend from the front side thereof to both the right and left sides thereof. The cooler is positioned in an upper and lower directional space formed between a top bridge of on an upper portion of the head pipe and a bottom bridge on a lower portion thereof, and in a right and left directional space formed between a pair of right and left front fork pipes which are inserted through the top and bottom bridges. Additionally the cooler is fixed through an attaching stay means to the head pipe and thus, does not rotate with the fork pipes.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
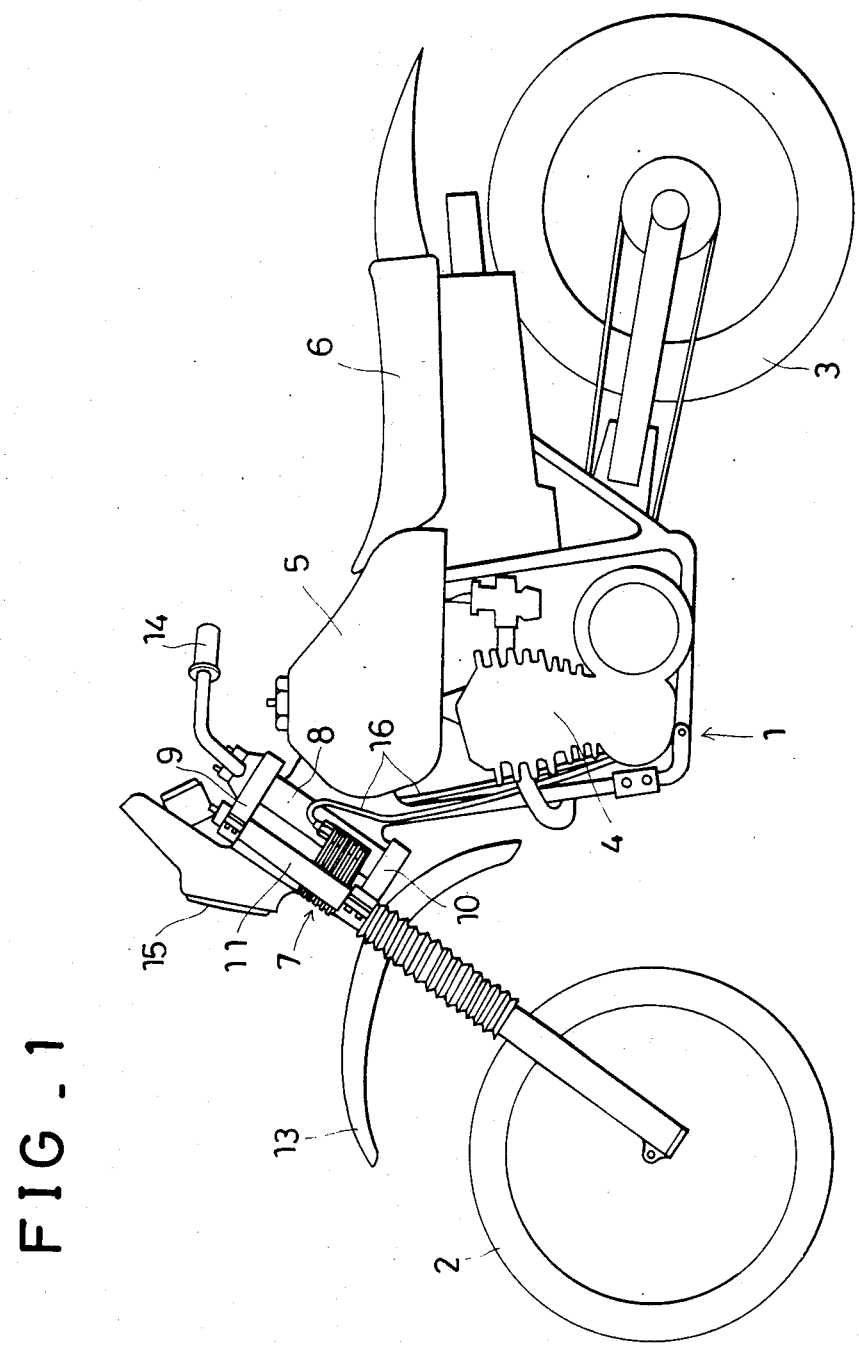
FIG. 1 is a side view of one embodiment of a motorized two-wheeled vehicle having this invention.
Figure 2:
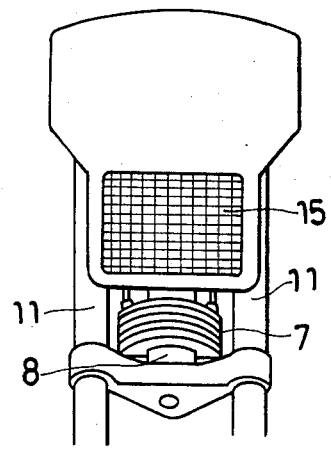
FIG. 2 is a front view of an important portion thereof.

Embodying examples of this invention will now be explained with reference to the accompanying drawings:

Referring to the drawings, a vehicle body frame 1 is provided with a front wheel 2, a rear wheel 3, an internal combustion engine 4 in the middle thereof, a fuel tank 5 on an upper side thereof, and a driver's seat 6 in rear thereof so as to form, as a whole, a motorized two-wheeled vehicle. On an upper part of a front side thereof an oil cooler 7 is provided for air-cooling oil introduced thereinto from the interior of the engine 4.

The above construction is not especially different from that of the foregoing conventional apparatus. According to this invention, the oil cooler 7 is a shaped one that surrounds a circumference of a head pipe 8 constituting a front portion of the vehicle body frame 1, so as to extend from the front side thereof to both the right and left sides thereof. The cooler 7 is positioned in an upper and lower directional interval space formed between a top bridge 9 on an upper part of the head pipe 8 and a bottom bridge 10 on a lower part thereof, and in a right and left directional interval space formed between a pair of right and left front fork pipes 11, 11 inserted through the two bridges 9, 10. In addition, the cooler 7 is fixed through an attaching stay means 12 to the head pipe 8 and does not rotate with the fork pipes.

More in detail, the pair of front fork pipes 11, 11 extend in upper and lower directions on both lateral outsides of the front wheel 2 and a front fender 13 located above the front wheel 2, and are provided on their upper portions with the top bridge 9 and on their lower portions with the bottom bridge 10 so as to form, as a whole, the front fork. This front fork is provided on its top surface with a steering handle 14 so as to be turnable thereby for steering the front wheel 2. The same is also provided on a front surface on an upper portion thereof with a headlight 15.

The foregoing construction is not especially different from the conventional one. With this arrangement, there is formed around the head pipe 8, a space that is defined at its upper side by the top bridge 9, at its lower side by the bottom bridge 10 and at its right and left sides by the fork pipes 11, 11. According to this invention, this space is utilized for mounting the oil cooler 7.

Figure 3:
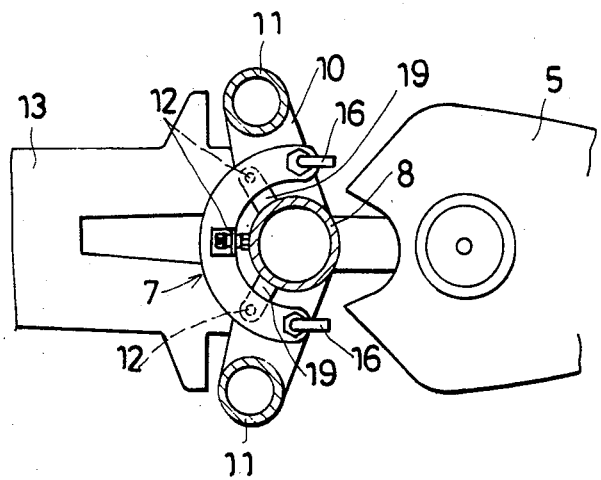
FIG. 3 is a top plan view, partly in section, of the same.

The oil cooler 7 is formed, for instance, into an arcuate shaped one as viewed from above, as shown in FIG. 3, and embraces the head pipe 8 so as to extend from the front side thereof to both the right and left sides thereof. In addition, the arcuate shaped oil cooler 7 is connected, at its right and left opposite end parts, to respective inlet and outlet oil hoses 16, 16 extending between the same and the engine 4 so that oil may be led through those hoses 16, 16 to circulate between the same and the engine 4.

Figure 4:
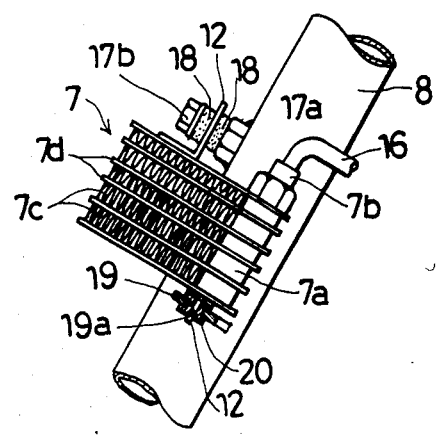
FIG. 4 is a side view, partly in section, thereof.

A manner of fixing of the oil cooler 7 through the attaching stay means 12 to the head pipe 8 of the vehicle frame 1 is clearly shown, for instance, in FIG. 4. Namely, in the illustrated example, the attaching stay means 1 comprises a single stay means 12 on an upper side of the oil cooler 7 and two stay means 12 on a lower side thereof. The upper stay means 12 is a plate type stay and is put on a boss nut 17a provided on the front surface of the head pipe 8 and is fastened thereto with a bolt 17b applied thereto from front. In this case, respective rubber members 18, 18 are interposed between the mutually opposite surfaces of the front and rear layer members. Additionally, each of the lower stay means 12, 12 is a pin type stay and is so attached to the head pipe 8 as to be detachably inserted, through an annular rubber member 20 mounted thereon, in an opening 19a made in each of a pair of right and left brackets 19, 19 projecting forwards from the head pipe 8.

Next, the operation of the apparatus with be explained as follows:

The oil in the engine is introduced into the oil cooler 7 while being led to circulate between the same and the engine 4 through the respective oil hoses 16, 16. During running of the vehicle, the oil cooler, that is, the introduced oil is exposed to running air from front and is cooled thereby. This is not especially different from the case of the conventional apparatus. According to this invention, however, the oil cooler 7 is so provided as to surround the circumference of the head pipe 8 constituting the front portion of the vehicle body frame 1 and is fixed to the pipe 8. Accordingly, at the time of turning of the front fork during steering, the oil cooler 7 is never moved or turned therewith. Also on that turning occasions, the oil hose 16 is never caused to be bent, so that there can be eliminated the foregoing inconveniences with the conventional apparatus. Additionally, the cooler 7 has generally a comparatively large surface area to be acted with the running air, so that its cooling efficiency is improved. Because the cooler 7 is below and above the bridges 9, 10, respectively and to the right and left sides of the fork pipes 11, 11, the same can be protected by those members from any external force and is free from any damage.

Figure 5:
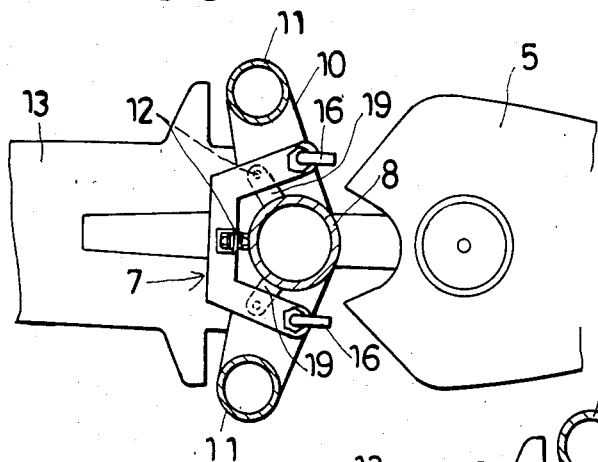
FIGS. 5-8 are top plan views, similar to FIG. 3, of modified embodiments using oil coolers of different shapes.
Figure 6:
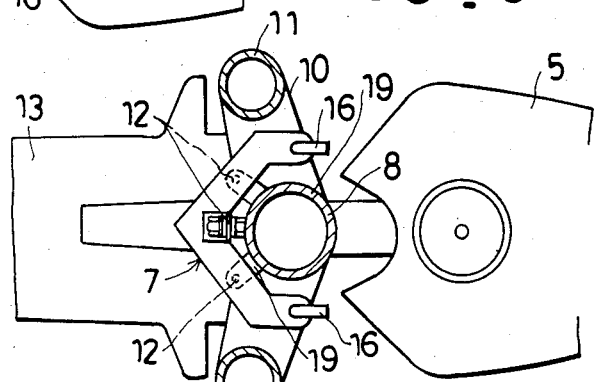

The oil cooler 7 is formed into an arcuate shaped one as viewed from above in the foregoing example, but the same is not limited thereto. Namely, the same may be formed into polygonal shaped one as viewed from above as shown in FIGS. 5 and 6, for instance, or may be formed into a V-shaped one as viewed from above as shown in FIG. 7, or may be formed into a channel shaped one as viewed from above, as shown in FIG. 8, wherein the front part thereof extends straight in right and left directions, and the opposite end parts thereof are bent rearwards nearly at right angles.

Figure 8:
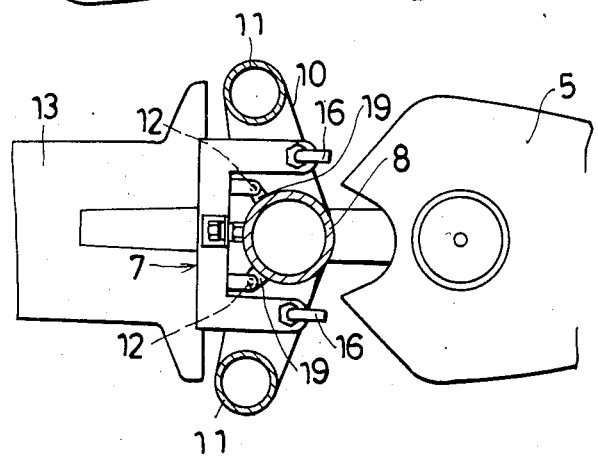
Figure 9:
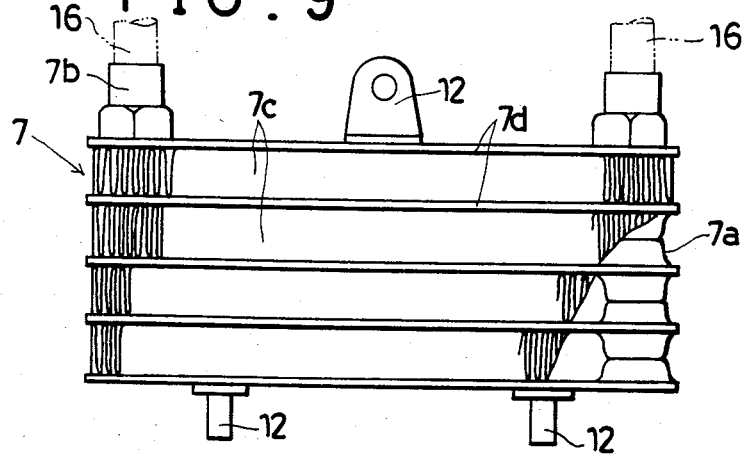
FIG. 9 is an enlarged front view, partly omitted, of the oil cooler shown in FIG. 8.
Figure 10:
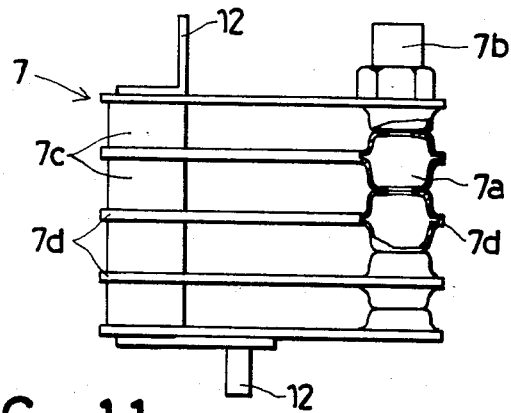
FIG. 10 is a side view thereof.
Figure 11:
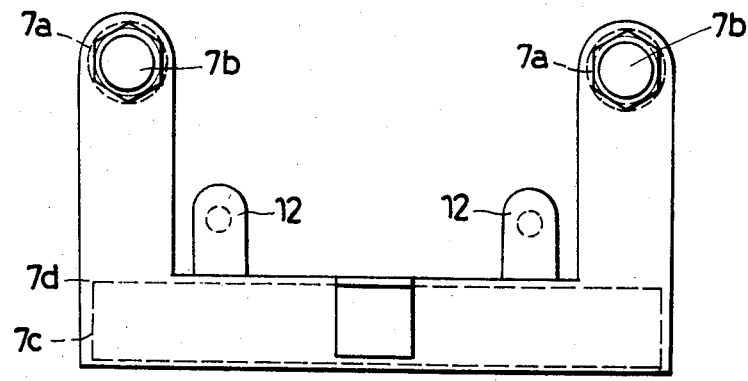
FIG. 11 is a top plan view of the same.

If the illustrated example of FIG. 8 is constructed as shown clearly in FIGS. 9-11, each of the rearwardly right angular bent parts of the oil cooler 7 is provided, at its end, with an upper and lower directional oil communication passage 7a, and a connecting opening 7b for the oil hose 16. It becomes possible that the same can be improved in its cooling efficiency by attaching radiation fins 7c to the whole width of the front straight part of the cooler 7.

More in detail, the oil cooler 7 is so constructed that the number of hollow flat pipe members 7d, each being made of two hoops jointed together, are put one upon another at their swelled ends to form the channel-shaped cooler of upper and lower plural spaced stages. Each of a number of radiation fins 7c made of wave formed panels is inserted in each spaced front part of the cooler 7. The pipe members 7d are, at the swelled ends, communicate one with another to form the upper and lower directional oil communication passages 7a, 7a. Thus, the cooler 7 has such a function that the oil is introduced therein through the oil hose 16 from the engine 4 to the connecting opening 7b connected to the oil communication passage 7a at one end thereof, and is then led to the oil communication passage 7a at the other end thereof through the respective pipe members 7d. During this time the oil is well cooled by the air-cooling action of the running air at the radiation fins 7c, and thereafter is returned to the engine 4 through the oil hose 16 from the connecting opening 7b connected to the oil communication portion 7a at the other end thereof.

Figure 7:
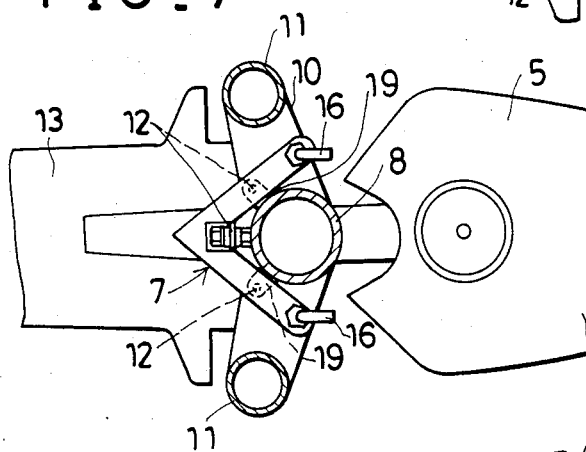

If the oil cooler 7 is formed into the V-shaped one as viewed from above as shown in FIG. 7, each panel for each pipe member 7d becomes a V-shaped one. Accordingly, those V-shaped panels can be formed by being punched out from a blank material without mutual gaps. The raw material yield becomes good and thus those panels can be obtained comparatively economically. Additionally, the front surface of the V-shaped oil tank 7 is inclined in relation to front and rear directions, so that the same is decreased in possibility of adhesion of foreign matters much as splashed mud or the like during driving, and thus this type one is suitably applicable to a vehicle for off-road driving.

Thus, according to this invention, the oil cooler is formed into such a shape that surrounds the circumference of the head pipe so as to extend from its front side to its both right and left sides, and is fixed to the head pipe, so that the same becomes free from the foregoing inconveniences in the conventional apparatus wherein the same is fixed to the front fork. There can be obtained a comparatively large radiation area to improve the cooling efficiency of the cooler. Additionally, the cooler is interposed between the upper and lower bridges and the right and left fork pipes, so that the cooler does not protrude outside and has a good appearance. Additionally the same can be protected by the bridges and the pipes from an external force and no damage thereof is caused thereby.

It is readily apparent that the above-described oil cooler apparatus in motorized two-wheeled vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An oil cooler apparatus in a motorized two-wheeled vehicle including a vehicle body frame having a front wheel, a rear wheel and an internal combustion engine in the middle thereof, the oil cooler being mounted on an upper part of a front side of the frame for air-cooling oil introduced thereinto from the engine, characterized in that the oil cooler is shaped to surround a circumference of a head pipe constituting a front portion of the vehicle body frame and has a front portion positioned in front of the front side of said head pipe and rearwardly extending portions positioned adjacent the right and left sides of said head pipe; the cooler is positioned in an upper and lower directional space formed between a top bridge on an upper portion of the head pipe and a bottom bridge on a lower portion thereof with said rearwardly extending portions in a right and left directional space formed between a pair of right and left front fork pipes which are inserted through the top and bottom bridges, and the cooler is fixed through an attaching stay means to the head pipe.

2. An oil cooler apparatus as claimed in claim 1, wherein the oil cooler is formed into an arcuate shaped one as viewed from above.

3. An oil cooler apparatus as claimed in claim 1, wherein the oil cooler is formed into a polygonal one as viewed from above.

4. An oil cooler apparatus as claimed in claim 1, wherein the oil cooler is formed into a V-shaped one as viewed from above.

5. An oil cooler apparatus as claimed in claim 1, wherein the oil cooler is formed into a channel shaped one as viewed from above having a front portion thereof extending straight in right and left directions, and both end portions thereof being bent rearwards nearly at right angles.

6. An oil cooler apparatus as claimed in claim 5, wherein each of both the rearwardly bent end portions of the oil cooler is provided with an upper and lower directional oil communication passage and a connecting opening for an oil hose, and radiation fins are attached to the front part of the cooler and extend over the whole width and in the right and left directions thereof.

7. An oil cooler apparatus as claimed in claim 6, wherein the oil cooler comprises a plurality of hollow flat pipe members aligned in parallel from one end portion to the other end portion, each pipe member having swelled ends which when assembled define said upper and lower directional communication passages, and said fins comprise wave-formed panels inserted in each spaced opening between adjacent flat pipe members.

* * * * *